Figure 1:
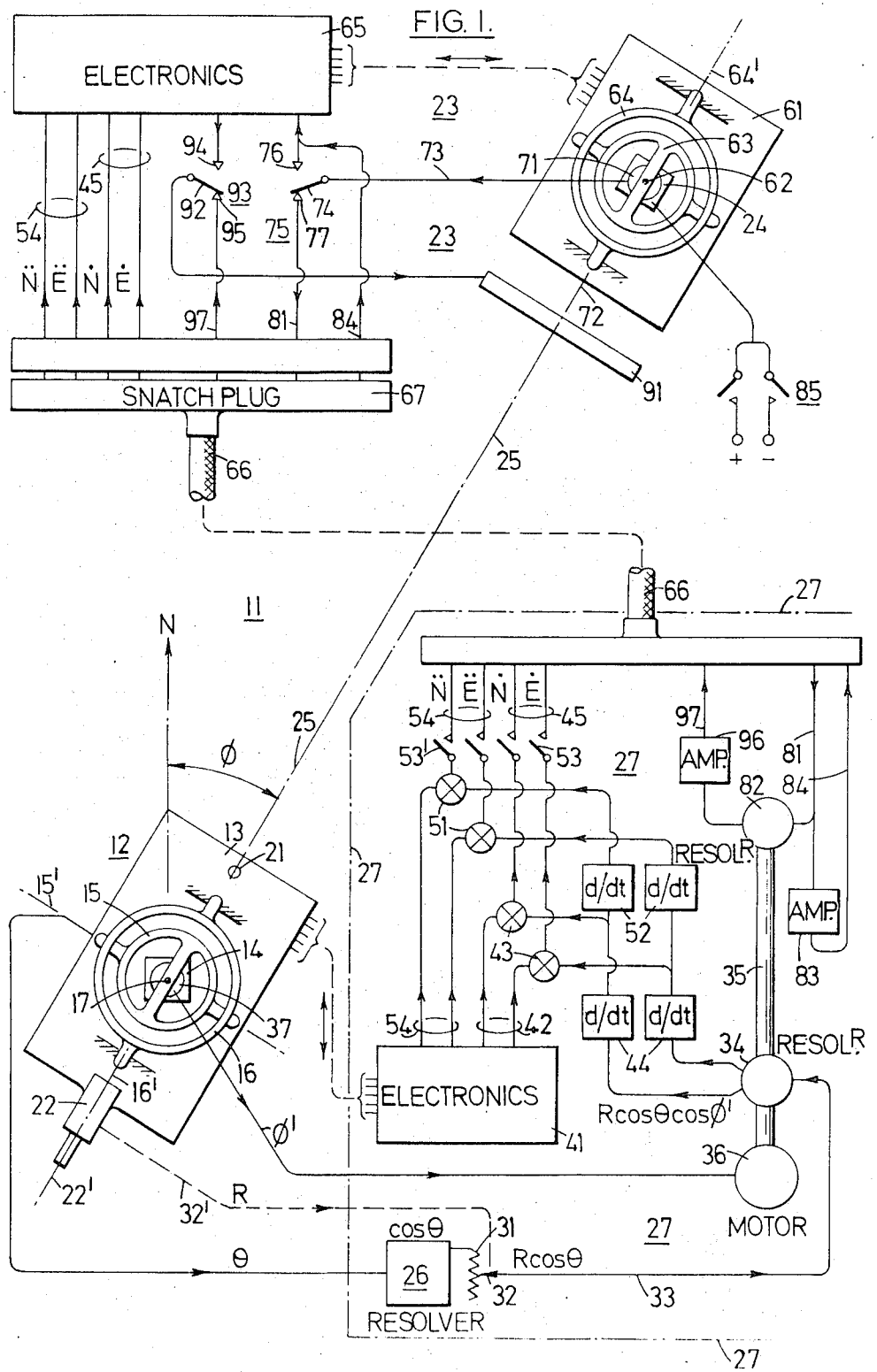

United States Patent [19]
Brown

[11] 3,790,766
[45] Feb. 5, 1974

[54] INERTIAL NAVIGATION SYSTEMS
[75] Inventor: Kenneth Robson Brown, Midlothian, Scotland
[73] Assignee: Ferranti Limited, Hollinwood, Lancashire, England
[22] Filed: Mar. 5, 1971
[21] Appl. No.: 121,604

[52] U.S. Cl............ 235/150.25, 74/5.34, 244/77 R
[51] Int. Cl............................................. G06f 15/50
[58] Field of Search. 74/5, 5.1, 5.34; 244/3.2, 77 R, 244/77 S, 1 SS, 1 SA; 318/580, 588; 235/150.25

[56] References Cited
UNITED STATES PATENTS
| | | | |
|---|---|---|---|
| 2,868,481 | 1/1959 | Seamans, Jr. et al. | 244/77 R |
| 2,964,266 | 12/1960 | Fuchs | 343/7.4 X |
| 3,260,485 | 7/1966 | Lerman et al. | 244/77 R |
| 3,547,381 | 12/1970 | Shaw et al. | 244/1 SA |

*Primary Examiner*—Samuel W. Engle
*Attorney, Agent, or Firm*—Cameron, Kerkam, Sutton, Stowell & Stowell

[57] ABSTRACT

Apparatus for quickly levelling and orientating the inertial navigation platforms of shipborne fighter aircraft prior to take-off including a shipborne reference inertial platform common to all the aircraft and stabilised against the ship's pitch, roll and yaw, together with a computer system for slaving to that reference platform the platform of each aircraft in turn.

8 Claims, 3 Drawing Figures

INERTIAL NAVIGATION SYSTEMS

This invention relates to inertial guidance systems of the kind in which each vehicle carries a three-axis inertial platform including three single-axis gyros and two linear accelerometers with an associated navigational computer and providing a head-up display of an aiming line at infinity. Such a platform will hereinafter be referred to for convenience as being of the type stated.

Where the vehicle is a ship-based aircraft, such as a fighter, difficulty is experienced in ensuring that the platform is accurately aligned, that is, levelled and orientated, with the ship's velocity at the aircraft fed into the computer, before take off. Various straightforward methods are known of aligning such a platform where the aircraft is land based; but the difficulty is greatly increased where the craft is based on a ship, and the platform and accelerometers are being subjected not only to the pitching, rolling, and yawing of the ship but also to its velocity vector. Such methods as are known are complicated, and have the additional disadvantage that the alignment process is apt to take a long time to carry our; and this delay is particularly undesirable where the aircraft is a fighter and take-off is required in a few minutes.

There is the further difficutly at sea that the aiming line of the display, being stabilised with respect to earth, undergoes deflections due to the pitch, roll, and yaw, of the ship and so cannot easily be kept on whatever shipborne target is being used for alignment.

An object of the present invention is to provide apparatus for aligning the inertial platform of a ship-borne aircraft in an inertial guidance system of the kind above referred to, the apparatus being to at least some extent less complicated than known apparatus for that purpose.

A further object is to provide such apparatus which enables the aligning processes to be effected appreciably quicker than in known systems.

Another object is to provide such apparatus in which the aiming line on an aircraft's display is not appreciably disturbed by the pitch, roll, and yaw of the ship.

In accordance with the present invention, there is provided for an inertial guidance system for aircraft based on a ship, where each aircraft possesses an inertial platform of the type stated, reference equipment, common to the said aircraft, for location on the ship and including a reference inertial platform of the type stated arranged to be maintained in a predetermined horizontal plane and orientated in a predetermined compass direction, pickoff means for deriving signals from the reference platform to represent orthogonal components of the ship's acceleration and velocity at the reference platform and converting them to local resolved values at each aircraft in dependence on the distance and bearing of that aircraft from the reference equipment, and means for applying those local resolved signals to level the inertial platform of the aircraft prior to take off.

There may be also provided means operable when the inertial platform of an aircraft is in said plane for comparing the headings of the reference and aircraft platforms and causing the pilot's head-up display to indicate when there is a difference between them, thereby allowing him to correct it by precessing the azimuth gimbal of his platform and so causing the platform to rotate in azimuth.

Figure 2:
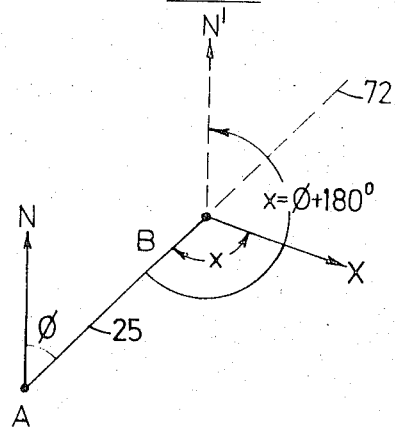
Figure 3:
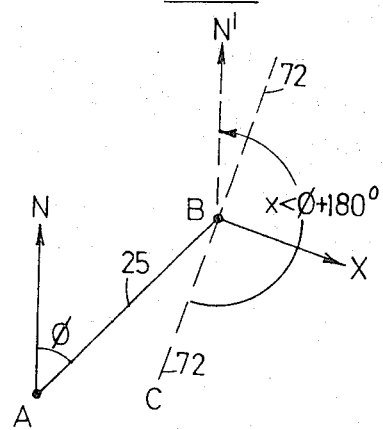

In the accompanying drwaings,

FIG. 1 is a view in plan, partly schematic, of one embodiment of the invention, and FIGS. 2 and 3 are diagrams to assist the understanding of the operation.

In accordance with one form of the invention, by way of example, an inertial guidance system for aligning with a reference inertial platform orientated North the inertial platforms of aircraft based on a ship, the deck 11 of which may be thought of as containing the plane of the paper, includes reference equipment 12 common to all the aircraft.

The equipment includes a casing 13 within which is a reference platform 14 containing the usual assembly of three single-axis gyros and two accelerometers none of which are visible. The casing also includes the usual apparatus for deriving signals from the accelerometers to represent the N-S and E-W components of acceleration and velocity at the platform, resolved in a predetermined horizontal plane which contains the platform when levelled, together with signals dependent on the pitch, roll, and heading—that is, yaw. This apparatus is also not shown.

Platform 14 is supported from the casing 13 by an inner pitch gimbal 15 and outer roll gimbal 16, having axes $15^1$ and $16^1$, so that in operation the azimuth axis 17 is vertical. Associated with the gimbals 15 and 16 are the usual servo motors and synchro transmitters, which are omitted to clarify the drawing.

The casing also supports a sighting mark in the form of a lamp 21 which illuminated for the aligning procedure so as to be clearly visible to each pilot through his head-up display when his craft is in the position for take-off.

Also attached to the casing 13 is means for determining the bearing of mark 21 as viewed from each aircraft and the range R of the craft from the reference platform 14. This takes the form of a telescope 22.

The casing as a whole, with the mark 21 and telescope 22, is rotatable about an axis which is normal to the deck 11 and which passes through the point of intersection of the gimbal axes $15^1$ and $16^1$. The optical axis $22^1$ of the telescope is coplanar with this axis of rotation (not visible in the drawing) of the casing 13 and with the roll axis $16^1$. By such rotation of the casing the telescope can be brought to bear on each aircraft in turn.

One such craft is indicated in part at 23 with its inertial platform at 24. The sighting line to it from the telescope 22 is indicated by the broken line 25, the range being $R\cos\theta$ where $\theta$ is the elevation of the sighting line above the horizontal plane of the levelled platform. This angle is derived from the synchro of the pitch gimbal 15 and is converted to a signal representing $\cos\theta$ in a resolver stage 26 forming part of computing means 27. This signal is applied to energise a potentiometer 31 the slider 32 of which is adjusted over a link $32^1$ from the telescope 22 in dependence on the range R as determined by the telescope using stadiametric techniques. The resulting signal $R\cos\theta$ is applied over a lead 33 to a resolver 34, forming another part of computing means 27, on a shaft 35. By way of a motor 36, shaft 35 is rotated in dependence on an angle $\phi^1, = \phi + 180°$, where $\phi$ is the bearing at the reference equipment (axis 17) with respect to north of aircraft 23 as derived by a synchro transmitter 37 associated with the azimuth gimbal (not visible) of platform 14. The reason for adding 180° will be explained later. Thus the outputs from resolver 34 are $R\cos\theta\cos\phi^1$ and $R\cos\theta\sin\phi^1$, these being the N-S E-W components of the range resolved in the platform plane.

Within the casing 13 is an electronic stage 41 which forms another part of computing means 27 and is for convenience depicted as separate from the casing. It serves to process the date derived from the various pickoffs and accelerometers of platform 14. Some of this data is fed back to the platform to control the respective gimbals so as to maintain the platform stabilised in known manner.

Further output signals from stage 41 representing the ship's velocity at the site of the reference platform 14 resolved in North and East directions and in the horizontal plane of the levelled platform are respectively applied over leads 42 as one of the two entries to two combining stages 43; to the other entries are applied the corresponding resolved outputs from stage 34 after differentiation at stages 44. Thus the outputs from stages 43 over leads 45 are signals which represent the velocity components at aircraft 23 resolved into N and E in the plane of the reference platform.

Further output signals representing accelerations at platform 14 are applied to combining stages 51 to the other inputs of which are applied the signals from resolver 34 after further differentiation at stages 52. The outputs from stages 43 and 51 are connected by way of switches 53 and 53$^1$ to leads 45 and 54, the signals on which, when the switches are closed, accordingly represent the N and E velocity and acceleration components at the aircraft.

The navigation equipment at aircraft 23 includes the inertial platform itself, 24, as already mentioned. It is supported within a casing 61 for rotation about an azimuth axis 62 by pitch and roll gimbals 63 and 64. It will be assumed for the moment that the aircraft is located so that the axis 64$^1$ of its roll gimbal, and hence the fore-and-aft line of the aircraft, are in alignment with the sight line 25. Also included in the casing is an electronic stage 65 which acts similarly to stage 41 to process data from platform 24 and feed it back to maintain the platform stabilised.

Further inputs to stage 65 are provided by the velocity and acceleration pairs 45 and 54 from computing means 27, the connection being by way of a cable 66 and a snatch plug 67. These inputs, as already stated, constitute the computed values of the velocity and acceleration experienced at the site of the aircraft.

The following arrangements are made for orientating platform 24 into agreement with platform 14 — that is (in the present example) so that both are headed north.

From a synchro transmitter 71 associated with the azimuth gimbal (not visible) of platform 24, a signal proportional to the bearing of the platform with respect to the aircraft's fore-and-aft line 72 is applied over a lead 73 to the moving contact 74 of a single pole changeover switch 75. One of the two fixed contacts 76 is connected to stage 65; the other, 77, is connected by a lead 81 through plug 67 and cable 66 to a second resolver 82 on shaft 35. From lead 81 a connection is made by way of an amplifier 83 in computing means 27, a lead 84 in cable 66, and plug 67, back to stage 65.

By way of a polarity-reversal switch 85 in the aircraft a positive or a negative source is connectable to an azimuth torque motor (not shown) associated with the azimuth gyro of platform 24.

The head-up display to provide the aiming line for the gunsight equipment of the aircraft is generally indicated at 91. The line is formed by a line trace on a cathode-ray tube (not shown). With no deflecting signals applied to the tube, the aiming line defines with the pilot's eye a line of sight straight ahead — that is,, in the direction defined by the fore-and-aft axis of the aircraft.

Under normal flight conditions the line of sight is stabilised in some direction with respect to earth by the signal output from the pickoff associated with the azimuth gyro. It can also be moved additionally by a signal derived from a manual control, such as a potentiometer, so as to point to any desired target, on which it will remain stabilised by the output from the azimuth pickoff despite movements of the aircraft. For guncontrol purposes, the aiming line may be controlled by some sort of predictor.

For the purpose of aligning the aircraft platform, the aiming line is freed from such controls and is instead controlled by a signal from resolver 82 as described later. For this purpose a control lead to the display 91 is made from the moving contact 92 of a single-pole changeover switch 93. One of its fixed contacts 94 is connected to stage 65. To the other contact 95 a connection is made from the output of resolver 82 by way of an amplifier 96, a lead 97 in cable 66, and plug 67.

In describing the operation, it will again be assumed that the aircraft's fore-and-aft line 22 coincides with the sight line 25; also that the reference platform has been in action long enough to be stable, lying in the horizontal plane above referred to and orientated due North, with the telescope aligned on this particular aircraft.

The insertion of the snatch plug 67 energises simple relay systems (not shown) one of which operates the two changeover switches 75 and 93 to the positions depicted in FIG. 1 — that is to say, with the respective moving contacts engaging fixed contacts 77 and 95 — and the other of which allows the pilot to control switches 53 and 53$^1$ in the computer 27 of the reference equipment. To begin with, he causes switches 53$^1$ to be closed, and so apply the acceleration signals to leads 54.

A coarse levelling of platform 24, carried out at a comparatively rapid rate, is thus begun, the acceleration signals in leads 54 serving to null the response of the aircraft's accelerometers to linear accelerations due to the ship's motion and so allow the accelerometers to effect the coarse levelling by responding to gravity only in the manner known when levelling an inertial platform on land.

After a minute or so, the pilot opens switches 53$^1$, thereby disconnecting the acceleration signals, and closes switches 53. The velocity data in leads 45 then completes the levelling at a comparatively slow speed to a high degree of accuracy in the known Schuler tuning manner.

The signals over leads 45 also serve to insert into the aircraft's navigation computer (not shown, but forming part of electronic stage 65) the initial conditions of velocity, to which will be added after take-off the velocities derived by integration from the aircraft's accelerometers.

With the levelling completed, the next step is to orientate platform 24 so as to head North. The principle on which this is done may best be understood from consideration of the diagram of FIG. 2, which is again a plan view but to a much smaller scale than FIG. 1.

A and B represent the positions of the vertical azimuth axes of the reference and the aircraft platforms; thus the line AB represents the sight line 25, which is again assumed to be in line with the aircraft's fore-and-aft line 72. The line AN indicates the reference platform's heading North, with $\phi$ the angle NAB, whilst the line $BN^1$ represents the heading North to which it is desired to direct the aircraft's platform. It is also assumed that at the end of the levelling process, the aircraft's platform is orientated in some fortuitous direction BX, at an angle $x°$ with the sight line AB.

It will be seen from a study of the diagram that it is necessary for platform 24 to be at angle of $(\phi+180)$ with respect to the sight line when headed North. The 180° is added by suitably adjusting the synchro transmitter 37 of the reference platform 14.

To carry out the orientation, then, the bearings $x$ and $(\phi+180)$ are compared, and the pilot torques the output axis of the azimuth gyro of platform 24, thereby causing the platform to rotate till the angles are equal.

The comparison is effected in computer 27 of the reference equipment, where the resolver 82 represents the angle $\phi+180$, and the angle $x$ (as derived by synchro transmitter 71) is applied to the resolver by way of lead 73, fixed contact 77 of switch 75, plug 67, and lead 81 in cable 66. The output from resolver 82, representing the difference between those angles, is returned to the aircraft by way of amplifier 96 and lead 97; thence it is applied by way of contacts 95 and 92 to control the head-up display 91 in such manner that when the angles are equal the aiming line of the display is in line with the sighting mark 21 of the reference equipment.

By torquing the azimuth gyro of his platform, therefore, the pilot can adjust the position of the aiming line until it bears on the sighting mark. The angles $(\phi+180)$ and x, as compared at the reference equipment, are then equal, and his platform orientated due North.

It is found in practice that the overall time taken for the coarse and fine levelling, followed by the orientation as described in the immediately preceding paragraphs, can be accomplished in barely three minutes.

The orientation procedure is the same when the fore-and-aft line of the aircraft is not in precise alignment with the sight line, the correct orientation of the platform being reached as before when the aiming line coincides with the sighting mark. As the signal from synchro transmitter 71 is dependent on the azimuth gimbal bearing with respect to the fore-and-aft line of the craft, the angle $x$ in these circumstances will not be equal to $(\phi+180)$ when the platform is orientated due North. This will be understood from a glance at FIG. 3, which repeats the diagram of FIG. 2 but with the fore-and-aft line 72 no longer coincident with the sight line 25 but displaced to some position such as BC. When therefore the platform has reached the bearing North, the signals compared at resolver 82 are not equal. The resulting difference signal, however, is such as to displace the aiming line for coincidence with the fore-and-aft line to compensate for this misalignment with the result that the aiming line is again in register with the sighting mark when a true North bearing is attained.

During the aligning procedure the initial conditions of velocity are added to the aircraft's navigational computer as already described.

On withdrawal of the snatch plug at take-off, the associated relay system causes switches 75 and 93 to changeover to their fixed contacts 94 and 76, and so restores both the head-up display 91 and the output from synchro transmitter 71 to stage 65 direct.

The reason why the synchro signal is not applied to stage 65 direct during alignment but by way of amplifier 83 of the reference equipment is that such amplification is required to correct for the degrading of the signal due to its application to resolver 82. The amplifier is located on the reference equipment merely to avoid loading the aircraft with it.

A convenient way of enabling the operator of the reference equipment to align the telescope and hence the reference platform on an aircraft is for him to bracket the reflector glass of the aircraft's display system with markers in the telescope.

Owing to the closeness of the sighting mark to the aircraft, parallax errors may arise when the pilot is adjusting the aiming line into register with the sighting mark. It may be necessary therefore to make arrangements to show him when his eye is on the optical axis of the system. Such arrangements are the subject of our co-pending British Pat. application No. 10791 of Mar. 6, 1970.

In addition to the considerable advantage of enabling the alignment to be carried out in so short a time as a few minutes, the apparatus of the invention has the further advantage that the aiming line of an aircraft's display is used only after the associated platform has been levelled and is therefore not appreciably disturbed by the pitch, roll, and yaw of the ship.

The alignment procedure is the same for each of the other aircraft on the ship, the telescope 22 being directed to each in turn so that the sight line is centred on the craft's display reflector.

What I claim is:

1. For an inertial guidance system for aircraft based on a ship, where each aircraft carries a three-axis inertial platform including three single-axis gyros and two linear accelerometers with an associated navigational computer, reference equipment, common to the said aircraft, for location on the ship and including a three-axis reference inertial platform similar to the said inertial platform carried by each aircraft, means for operating the reference equipment so that in operation the platform is maintained in a predetermined horizontal plane and orientated in a predetermined compass direction, pickoff means for deriving signals from the reference platform to represent orthogonal components of the ship's acceleration and velocity at the reference platform, means for converting those derived signals to local resolved values at each aircraft in dependence on the distance and bearing of the aircraft from the reference equipment, and means for applying those local resolved signals to the inertial equipment of the aircraft so as to level its inertial platform prior to take-off.

2. Apparatus as claimed in claim 1 where each aircraft possesses means for providing the pilot with a head-up display of an aiming line at infinity, wherein each aircraft is further provided with means operable when the inertial platform of the aircraft is in said plane for comparing the headings of the reference and aircraft platforms and causing the said display to indicate when there is a difference between them, thereby allowing the pilot to correct that difference by precessing the azimuth gimbal of his platform anc so causing the platform to rotate in azimuth.

3. For an inertial guidance system for aircraft based on a ship, where each aircraft carries a three-axis inertial platform including three single-axis gyros and two linear accelerometers with an associated navigational computer with means for providing the pilot with a head-up display of an aiming line at infinity, reference equipment, common to the said aircraft, for location on the ship and including
  a three-axis reference inertial platform similar to the said inertial platform carried by each aircraft,
  means for operating the reference equipment so that in operation the reference platform is maintained in a predetermined horizontal plane and orientated in a predetermined compass direction,
  a sighting mark to be visible to the pilot of each aircraft through his head-up display where the aircraft is in position for take-off,
  means for determining the bearing of the sighting mark as viewed from each aircraft and the distance of the aircraft from the reference platform,
  means for deriving from the accelerometers of the reference platform signals to represent the North-South and East-West components of acceleration and velocity at the reference platform resolved in the said plane,
  and computing means for deriving from said signals and from the distance and bearing of the aircraft from the reference equipment the local velocity and acceleration components at the aircraft resolved into North-South and East-West directions in a horizontal plane,
  each aircraft being provided with
  means for applying those resolved components to level the platform of the aircraft prior to take-off,
  means operable when the inertial platform of the aircraft is level and the aircraft itself is at least approximately aligned on the sighting mark for causing the head-up display of the aircraft to respond to the difference between the said bearing of the sighting mark as viewed from the aircraft and the heading of the aircraft as derived from the inertial platform of the aircraft so as to cause the aiming line of the display to be in register with the sighting mark when the platform of the aircraft is in alignment in azimuth with the reference platform,
  and means to allow the pilot to precess the azimuth gimbal of the platform of his aircraft whilst observing said display until such alignment is achieved.

4. Apparatus as claimed in claim 3 wherein the computing means for deriving the local velocity and acceleration components at the aircraft includes resolvers for deriving from the distance R between the aircraft and the reference platform North-South and East-West signals proportional to $R\cos\theta\cos(180+\phi)$ and $R\cos\theta\sin(180+\phi)$, where $\theta$ is the angle of elevation from said horizontal plane of the sight line between the reference equipment and the aircraft and $\phi$ is the angle between said predetermined compass direction and said sight line as resolved in that plane,
  means for deriving the first-order time derivatives of the said North-South and East-West signals and adding them to the said signals which represents the North-South and East-West components of velocity at the reference platform and so produce the corresponding components at the aircraft,
  and means for deriving the second-order time derivatives of the said North-South and East-West signals and adding them to the said signals which represents the North-South and East-West components of acceleration at the reference platform and so produce the corresponding components at the aircraft.

5. Apparatus as claimed in claim 3 wherein the reference platform is supported by inner and outer gimbals from a casing which is rotatable about an axis which is normal to the deck of the ship and passes through the point of intersection of the gimbal axes, said means for determining the bearing of the sighting mark including a telescope attached to said casing with the optical axis of the telescope coplanar with the axis of the outer gimbal and the axis of rotation of the casing, whereby a rotation of the casing allows the telescope to be brought to bear on each aircraft in turn.

6. Apparatus as claimed in claim 4 wherein said telescope also serves as said means for determining the distance of the aircraft from the reference platform.

7. In an inertial guidance system for aircraft based on a ship, where each aircraft carries a three-axis inertial platform including three single-axis gyros and two linear accelerometers with an associated navigational computer and providing in operation a head-up display of an aiming line at infinity, reference equipment, common to the said aircraft, for location on the ship, and including
  a three-axis reference inertial platform similar to the said inertial platform carried by each aircraft,
  means for operating the reference equipment so that in operation the platform is maintained level and orientated in a fixed known compass direction,
  and pickoff means for deriving signals from the reference platform to represent orthogonal components of the ship's acceleration and velocity at the reference platform.

8. In an inertial guidance system for aircraft based on a ship, where each aircraft carries a three-axis inertial platform including three single-axis gyros and two linear accelerometers with an associated navigational computer and providing in operation a head-up display of an aiming line at infinity, reference equipment common to the said aircraft, for location on the ship and including
  a three-axis reference inertial platform similar to the said inertial platform carried by each aircraft,
  means for operating the reference equipment so that in operation the reference platform is maintained level and orientated in a fixed known compass direction,
  a sighting mark to be visible to the pilot of each aircraft through his head-up display where the aircraft is in position for take-off,
  means for determining the bearing of the sighting mark as viewed from each aircraft and the distance of the aircraft from the reference platform,
  means for deriving from the accelerometers of the reference platform signals to represent the North-South and East-West components of acceleration and velocity at the reference platform together with signals dependent on the rates of pitch- roll, and heading at the reference platform,
and computing means for deriving from said signals and from the distance and bearing of the aircraft from the reference equipment the local velocity and acceleration components at the aircraft resolved into North-South and East-West directions.

* * * * *

UNITED STATES PATENT OFFICE
CERTIFICATE OF CORRECTION

Patent No. 3,790,766     Dated Feb. 5, 1974

Inventor(s) Kenneth Robson Brown

It is certified that error appears in the above-identified patent and that said Letters Patent are hereby corrected as shown below:

Cover page, after item [21], insert
--[30] Foreign Application Priority Data Mar. 6, 1970
Great Britain 10956/70--
Column 7, line 5, "anc" should read --and--.

Signed and sealed this 13th day of August 1974.

(SEAL)
Attest:

McCOY M. GIBSON, JR.            C. MARSHALL DANN
Attesting Officer               Commissioner of Patents